US010591030B2

(12) United States Patent
Maji et al.

(10) Patent No.: US 10,591,030 B2
(45) Date of Patent: Mar. 17, 2020

(54) APERTURE-PLATE MOVING MECHANISM

(71) Applicant: SHIMADZU CORPORATION, Kyoto-shi, Kyoto (JP)

(72) Inventors: Takeshi Maji, Kyoto (JP); Shunsuke Atsumi, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 285 days.

(21) Appl. No.: 15/799,402

(22) Filed: Oct. 31, 2017

(65) Prior Publication Data

US 2018/0119782 A1    May 3, 2018

(30) Foreign Application Priority Data

Nov. 1, 2016  (JP) .................................. 2016-214621

(51) Int. Cl.
*B25B 1/00* (2006.01)
*F16H 25/20* (2006.01)
(Continued)

(52) U.S. Cl.
CPC ......... *F16H 25/2003* (2013.01); *G02B 5/003* (2013.01); *G02B 21/0004* (2013.01);
(Continued)

(58) Field of Classification Search
CPC .... B25B 1/00; B25B 1/02; B25B 1/08; B25B 1/10; B23P 11/00; B23Q 3/06
See application file for complete search history.

(56) References Cited

U.S. PATENT DOCUMENTS 3,580,459 A * 5/1971 Gage ...................... B23K 20/12
228/2.3
4,341,375 A * 7/1982 Romanin ................ B25B 1/103
269/153
(Continued)

FOREIGN PATENT DOCUMENTS

JP      01-71123 A      3/1989
JP      7-63994 A       3/1995
(Continued)

OTHER PUBLICATIONS

Notice of Reasons for Recusal dated Jan. 7, 2020 issued by the Japanese Patent Office in counterpart application No. 2016-214621.

*Primary Examiner* — Lee D Wilson
(74) *Attorney, Agent, or Firm* — Sughrue Mion, PLLC

(57) ABSTRACT

Provided is an aperture-plate moving mechanism, including: a drive block 308 fixed to an aperture plate 301; a linear motion guide 306 for allowing the drive block to move along an axis while preventing the drive block from moving in other directions; a feed screw 302 laid in a direction of the axis; a nut member 305 having a threaded hole engaged with the feed screw, the nut member being prevented from rotating due to a rotation of the feed screw; and an urging member 309 for pressing the drive block onto the nut member in the direction of the axis. With respect to the direction of the axis, the contact portion of either the drive block or the nut member is a convex surface, while the contact portion of the other member is a concave surface having a larger radius of curvature than the convex surface.

16 Claims, 5 Drawing Sheets

(51) Int. Cl.
  *G02B 21/00* (2006.01)
  *G02B 21/08* (2006.01)
  *G02B 21/04* (2006.01)
  *G02B 5/00* (2006.01)
  *G02B 21/36* (2006.01)
(52) U.S. Cl.
  CPC ........... *G02B 21/04* (2013.01); *G02B 21/088* (2013.01); *F16H 2025/204* (2013.01); *F16H 2025/2059* (2013.01); *F16H 2025/2075* (2013.01); *G02B 5/005* (2013.01); *G02B 21/361* (2013.01)

(56) References Cited

U.S. PATENT DOCUMENTS

| | | | |
|---|---|---|---|
| 6,012,712 A * | 1/2000 | Bernstein | B25B 1/2405 |
| | | | 269/160 |
| 2008/0123201 A1 | 5/2008 | Ishimasa | |
| 2016/0214235 A1* | 7/2016 | Taylor | B25B 1/103 |
| 2018/0119782 A1* | 5/2018 | Maji | F16H 25/003 |

FOREIGN PATENT DOCUMENTS

| | | |
|---|---|---|
| JP | 2000-180726 A | 6/2000 |
| JP | 2008-52005 A | 3/2008 |
| JP | 2013-83729 A | 5/2013 |

\* cited by examiner

Fig. 4
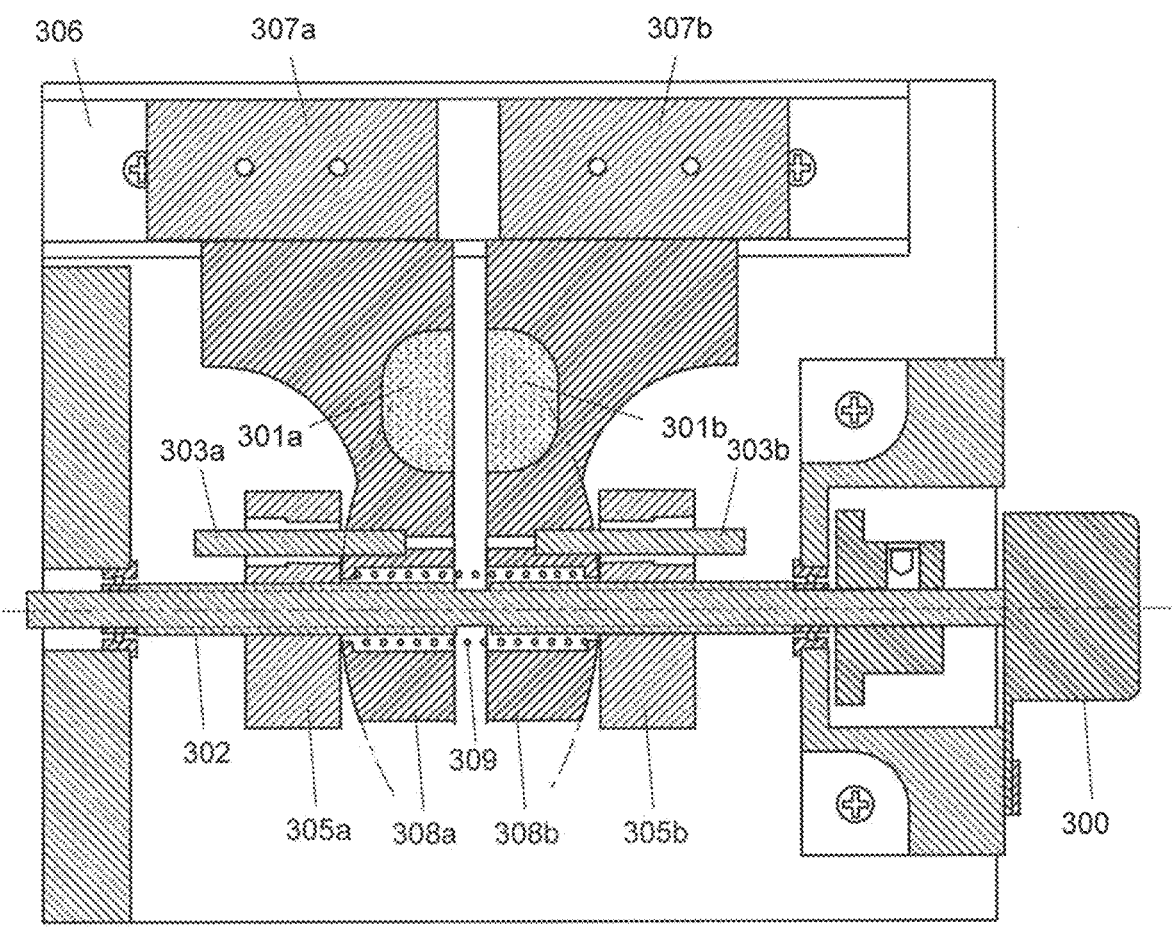
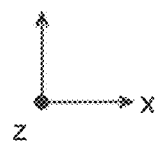

APERTURE-PLATE MOVING MECHANISM

TECHNICAL FIELD

The present invention relates to a mechanism for moving an aperture plate which defines the size of a measurement area on a sample in an infrared microscope or similar microscopic analyzer.

BACKGROUND ART

Microscopic analyzers are used for analyzing a micro-sized measurement area on a sample. In an infrared microscope, which is one type of the microscopic analyzer, a sample is analyzed by illuminating the sample with infrared light and obtaining a spectrum of the infrared light transmitted through or reflected by the sample (for example, see Patent Literature 1).

FIG. 1 shows one configuration example of the infrared microscope. In the infrared microscope, a sample 1 placed on a sample stage is illuminated with infrared light, and an emission of light from the illuminated area is detected with an infrared detector 9. There are two measurement methods in the infrared microscope. One method is to illuminate the sample 1 with the infrared light from the obverse side of the sample and detect the reflected light. The other method is to illuminate the sample from the reverse side of the sample 1 and detect the transmitted light.

The light emitted from the sample 1 is collected with a Cassegrain reflector 6 consisting of a concave mirror 6a with a through-hole formed at its center and a convex mirror 6b. The collected light falls onto the infrared detector 9 through a small opening (aperture 8) surrounded by a plurality of aperture plates. The aperture 8 is placed at a position which is conjugate to the sample 1 with respect to the Cassegrain reflector 6 (i.e. the position where the image of the sample 1 is formed). In a measurement, while checking the position on an image of the surface of the sample 1 taken with a camera 22, an operator drives the sample stage to locate the measurement target area at the center of the visual field of the infrared microscope. Subsequently, the operator adjusts the size of the aperture 8 to limit the measurement target area.

The size of the aperture 8 is adjusted, for example, by moving two aperture plates which define the aperture width in one direction and two other aperture plates which define the aperture width in another direction that is perpendicular to the first direction. A feed screw (male screw) extending in the moving direction of the aperture plates is engaged with the threaded hole (female screw) formed in a drive block fixed to each aperture plate. A linear motion guide (translation bearing) determines the moving direction of the drive block while restricting the rotation of the same block. With such a mechanism, a rotation of the feed screw is converted into a linear motion of the drive block (and the aperture plate).

CITATION LIST

Patent Literature

Patent Literature 1: JP H7-63994 A

SUMMARY OF INVENTION

Technical Problem

The previously described drive mechanism is constructed by assembling a plurality of members. Ideally, those members should be assembled so that the axis of the feed screw becomes perfectly parallel to the linear motion guide. Actually, it is often the case that they are not perfectly parallel to each other due to some problems which occur in the production process, such as the size variation of each member or the assembling accuracy of those members. If the feed screw is not parallel to the linear motion guide, the feed screw is obliquely inserted into the threaded hole and comes in imbalanced contact with the inside of the threaded hole, causing the male screw to be locally in strong contact with the female screw. If the moving mechanism is operated in this state, a considerable force acts on the area where the male screw is in strong contact with the female screw, causing an abrasion of the screws. Consequently, the amount of backlash increases, and the accuracy of the moving distance of the drive block (i.e. the positional accuracy of the aperture) deteriorates. Furthermore, if the powder resulting from the abrasion of the contact areas of the male and female screws accumulates in the gap between the male and female screws, the rotation load on the feed screw significantly increases and eventually prevents the rotation of the feed screw.

Thus, in a mechanism for moving an aperture plate which defines the size of a measurement area on a sample in an infrared microscope or similar microscopic analyzer, the problem to be solved by the present invention is to provide a moving mechanism capable of accurately moving the aperture plate over a long period of time even if the axis of the feed screw is not perfectly parallel to the linear motion guide.

Solution to Problem

The aperture-plate moving mechanism according to the present invention developed for solving the previously described problem is a mechanism including:

a) a drive block fixed to an aperture plate;

b) a linear motion guide for allowing the drive block to move along an axis while preventing the drive block from moving in other directions;

c) a feed screw laid in a direction of the axis;

d) a nut member having a threaded hole engaged with the feed screw, the nut member being prevented from rotating due to a rotation of the feed screw; and e) an urging member for pressing the drive block onto the nut member in the direction of the axis to make a contact portion of the drive block be in contact with a contact portion of the nut member, where:

with respect to the direction of the axis, the contact portions of the drive block and the nut member are shaped so that one of the contact portions has a convex surface while the other contact portion has either a flat surface or a concave surface having a larger radius of curvature than the convex surface.

The aperture plate and the drive block may be formed as a single member, or they may be two independent members fastened together by screws or other methods.

The convex surface of the contact portion of either the drive block or the nut member may be a surface which has a curvature only in one direction (which is hereinafter called the "y-direction") perpendicular to the aforementioned axis (which is hereinafter called the "x-direction") and has no curvature in the direction (which is hereinafter called the "z-direction") perpendicular to both x and y directions (i.e. the convex surface may be a cylindrical surface). Needless to say, the convex surface may have a curvature in both y and z directions. In this case, the curvatures in the y and z directions do not need to be the same.

In the moving mechanism according to the present invention, the feed screw is engaged with the threaded hole formed in the nut member which moves independently of the drive block. This nut member is driven by a rotation of the feed screw. The urging member presses the drive block onto the nut member, whereby the drive block is made to follow the motion of the nut member. With respect to the direction of the axis, the contact portion of either the drive block or the nut member is a convex surface, while the contact portion of the other member is either a flat surface or concave surface having a larger radius of curvature than the convex surface.

As will be hereinafter described, there are a plurality of possible combinations of the shape of the contact portion of either the drive block or the nut member and that of the contact portion of the other member. The form of the contact between the two portions changes depending on the combination.

For example, if the contact portion of one member is a cylindrical convex surface having a curvature only in the y-direction while that of the other member is a cylindrical concave surface having a curvature only in the y-direction (with a larger radius of curvature than the aforementioned cylindrical surface), the two portions come in linear contact with each other along the z-direction at a position in the y-direction which minimizes the load on the motion of the drive block whose moving direction is determined by the linear motion guide and that of the nut member whose moving direction is determined by the feed screw, depending on the angle formed by the linear motion guide and the feed screw. Therefore, even if the linear motion guide and the feed screw are not parallel to each other in the x-y plane, their angular discrepancy can be absorbed.

If the contact portion of one member is a cylindrical convex surface having a curvature only in the y-direction while that of the other member is a flat surface, the two portions similarly come in linear contact with each other along the z-direction. In the case of this combination, a change in the position of the linear contact in the y-direction does not cause a significant change in the load on the motion of the drive block and the nut member. Therefore, an error of the distance between the linear motion guide and the feed screw in the y-direction ("parallel dislocation") can also be absorbed in addition to the angular discrepancy between the two members in the x-y plane.

If the contact portion of one member is a convex surface having a curvature in the y-direction while that of the other member is a convex surface having a curvature in the z-direction, the two portions come in point contact with each other at a position in each of the y and z directions which minimizes the load on the motion of the drive block and the nut member, depending on the angle formed by the linear motion guide and the feed screw. Therefore, even if the linear motion guide and the feed screw are not parallel to each other in the x-y plane as well as in the x-z plane, their angular discrepancy can he absorbed.

If the contact portion of one member is a convex surface having a curvature in both y and z directions (e.g. a spherical surface, although the curvatures in the two directions do not always need to be the same) while that of the other member is a flat surface, the two portions similarly come in point contact with each other at a position in each of the y and z directions which minimizes the load on the motion of the drive block and the nut member, depending on the angle formed by the linear motion guide and the feed screw. Furthermore, a change in the position of the point contact does not cause a significant change in the load on the motion of the drive block and the nut member. Therefore, a parallel dislocation of the linear motion guide and the feed screw can also be absorbed in addition to the angular discrepancy between these two members.

Thus, in the moving mechanism according to the present invention, if the linear motion guide and the feed screw are not parallel to each other, their angular discrepancy can be absorbed. Furthermore, as just described, their parallel dislocation can also be absorbed by some combinations of the contact portions. Therefore, the feed screw (male screw) and the threaded hole (female screw) of the nut member do not come in imbalanced contact with each other, so that the drive block as well as the aperture plate fixed to the drive block can be accurately moved over a long period of time.

Advantageous Effects of the Invention

With the aperture-plate moving mechanism according to the present invention, an aperture plate can be accurately moved over a long period of time even if the axis of the feed screw is not perfectly parallel to the linear motion guide.

BRIEF DESCRIPTION OF DRAWINGS

FIG. 4 is a sectional view illustrating a schematic configuration of the aperture-plate moving mechanism included in the infrared microscope according to the present embodiment.

DESCRIPTION OF EMBODIMENTS

Figure 1:
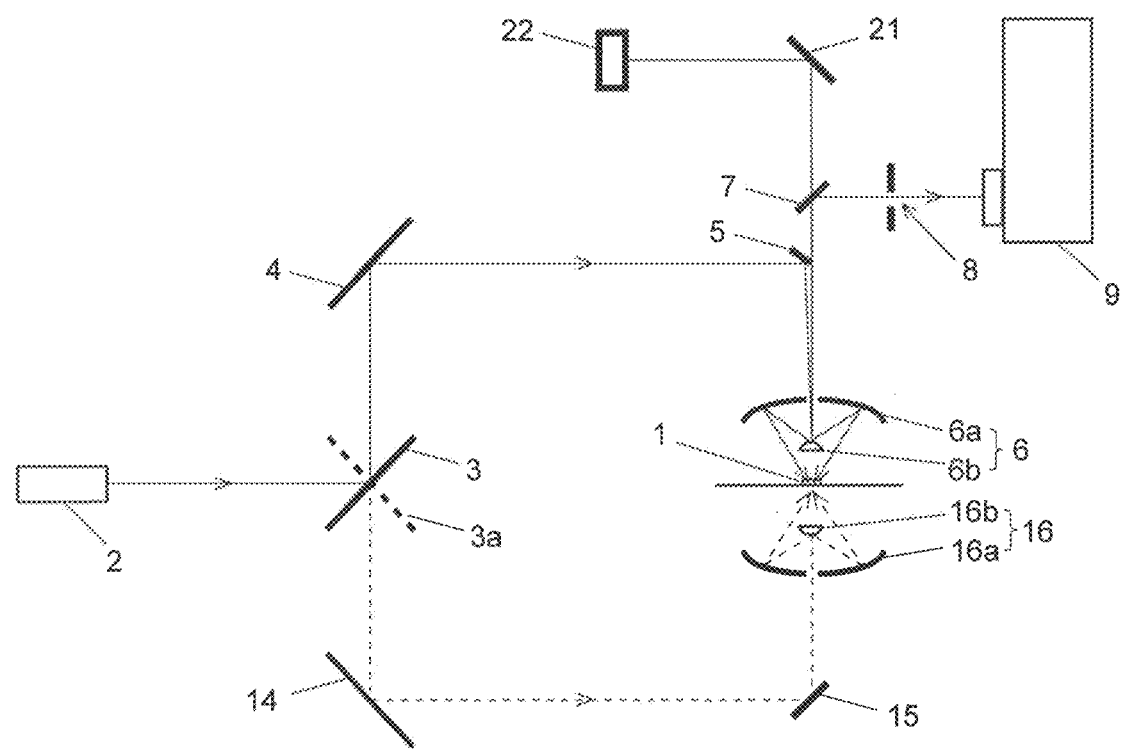
FIG. 1 is a diagram illustrating a schematic configuration of an infrared microscope.

An infrared microscope as one embodiment of a microscopic analyzer including an aperture-plate moving mechanism according to the present invention is hereinafter described with reference to the drawings.

The configuration of the infrared microscope in the present embodiment is similar to the one described earlier with reference to FIG. 1. The configuration is once more described with reference to the same figure. The infrared microscope in the present embodiment is capable of detecting either transmitted or reflected light from a sample 1 placed on a sample stage (not shown).

In the case of detecting reflected light from the sample 1, a beam of infrared light whose intensity temporally changes (interferogram) is generated by a light source unit 2 including an interferometer of a Fourier transform infrared spectrophotometer (FTIR). This light is sequentially reflected by a first mirror 3, second mirror 4 and third mirror 5. Then, the light passes through the hole formed at the center of the concave mirror 6a of the Cassegrain reflector 6 and falls onto the convex mirror 6b of the same reflector. Subsequently, the light is collected by the concave mirror 6a and cast onto the sample 1.

The reflected light from the sample 1 is collected by the concave mirror 6a and the convex mirror 6b (Cassegrain reflector 6). After being reflected by a mirror which reflects only infrared light ("hot mirror") 7, the light passes through an aperture 8 and is eventually detected by an infrared detector 9. A focusing optical system (not shown; e.g. Cassegrain reflector or concave reflector) for focusing the light from the aperture 8 onto the light-receiving surface of the infrared detector 9 is appropriately placed between the aperture 8 and the infrared detector 9. The aperture 8 and the light-receiving surface of the infrared detector 9 are each placed at a position which is conjugate to the sample 1 (a position at which an image of the sample s formed). By Fourier-transforming the detection signals produced by the infrared detector 9, a spectrum is obtained.

In the case of detecting transmitted light from the sample 1, the first mirror 3 is rotated by 90 degrees (the first mirror 3a indicated by the broken line in FIG. 1). The light emitted from the light source unit 2 is sequentially reflected by the first minor 3a, fourth mirror 14 and fifth mirror 15. Then, the light passes through the hole formed at the center of the concave mirror 16a of a Cassegrain reflector 16 and falls onto the convex mirror 16b of the same reflector. Subsequently, the light is collected by the concave mirror 16a and cast onto the sample 1. The light transmitted through the sample 1 is collected by the concave mirror 6a and the convex mirror 6b. After being reflected by the hot mirror 7, the light passes through the aperture 8 and is eventually detected by the infrared detector 9.

A visible-light mirror 21 provided above the sample 1 and a camera 22 are used for allowing operators to visually check the state of the surface of the sample 1 illuminated with visible light cast from a visible-light source (not shown).

Figure 2:
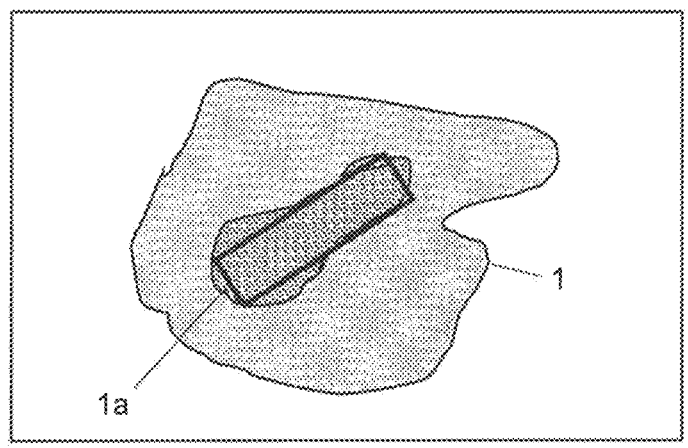
FIG. 2 is a diagram illustrating the process of determining a measurement target area on a sample in one embodiment of an infrared microscope according to the present invention.

In a measurement of the sample 1, the user determines the measurement target area 1a on the surface of the sample 1 (FIG. 2) while checking the visible image of the surface of the sample 1 taken with the camera 22. Subsequently, by operating the aperture-plate moving mechanism (which will be described later), the user adjusts the size and angle of the aperture 8 so that only the infrared light from the measurement target area 1a enters the infrared microscope.

The configuration of the aperture-plate drive mechanism used for adjusting the size and angle of the aperture 8 in the infrared microscope according to the present embodiment is hereinafter described with reference to FIGS. 3-8 as well as in comparison with the conventional configuration.

Figure 3:
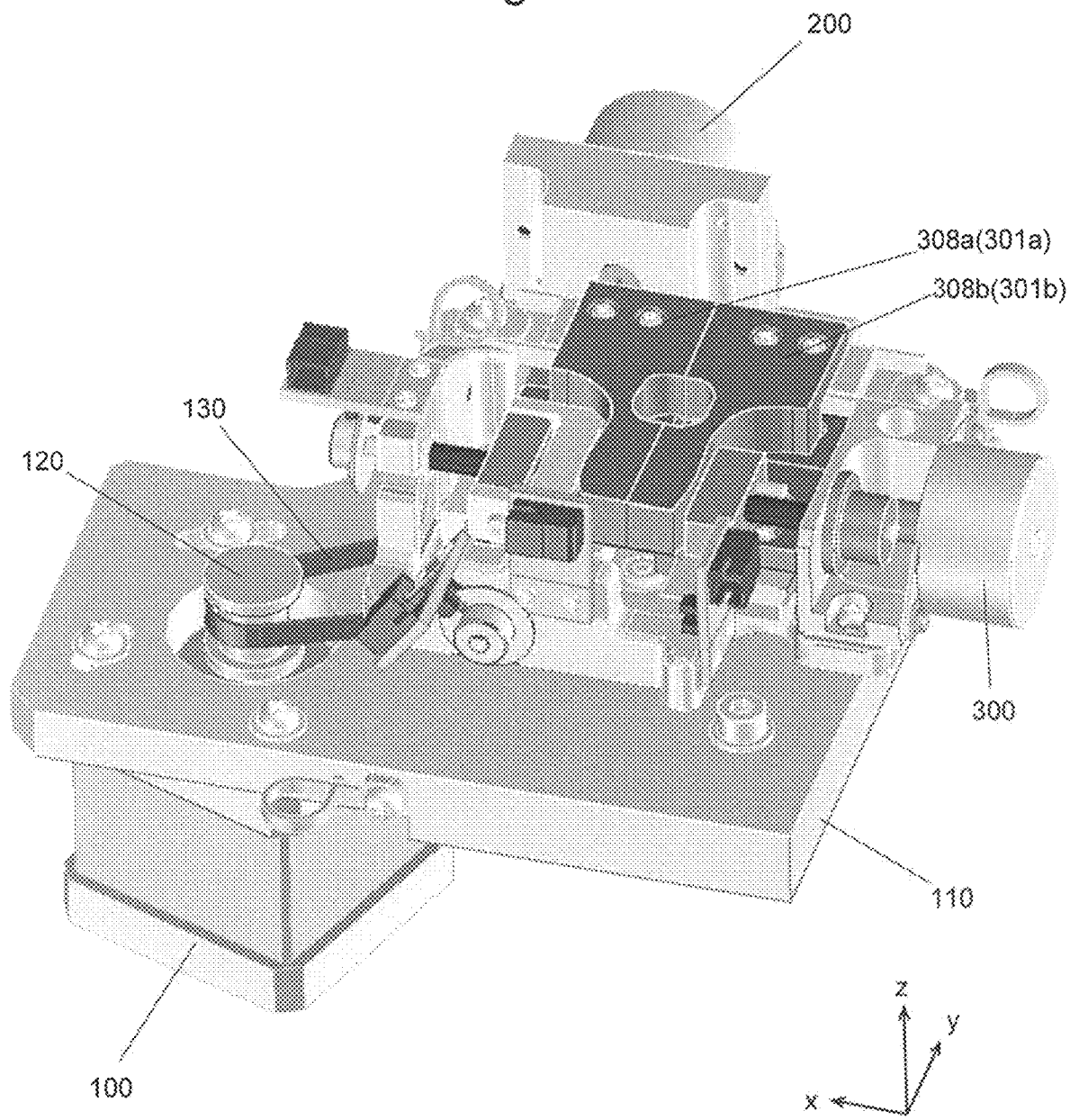
FIG. 3 is an external view of the aperture-plate drive mechanism included in the infrared microscope according to the present embodiment.

FIG. 3 is an external view of the aperture-plate drive mechanism in the present embodiment. The aperture plates which move in the y-direction are placed under the aperture plates 301a and 301b which move in the x-direction. The aperture-plate drive mechanism in the present embodiment is roughly composed of an aperture-plate moving mechanism for adjusting the size of the aperture 8 and an aperture-plate rotation mechanism for adjusting the angle of the aperture 8. The infrared microscope in the present embodiment is characterized by the aperture-plate moving mechanism.

The aperture-plate moving mechanism is provided for each of the two directions which are orthogonal to each other (which are called the "x-direction" and "y-direction"). These mechanisms are mounted in layers on an x-y stage 110 included in the aperture-plate rotation mechanism. The aperture-plate rotation mechanism includes a motor 100, rotation axis member 120, and hollow shaft in addition to the x-y stage 110. When the motor 100 is energized, the rotation axis member 120 rotates. Its rotation is transmitted to the hollow shaft via a belt 130. The hollow shaft has a through-hole formed at its center (i.e. at the position corresponding to the aperture 8). The shaft is also connected to the x-y stage 110. The rotation of the hollow shaft produces a rotation of the x-y stage 110 in the x-y plane. The motor 300 shown in the drawings is the drive source for rotating a feed screw (which will be described later) in the moving mechanism for the aperture plates 301a and 301b in the x-direction. Similarly, the motor 200 functions as the drive source in the moving mechanism for the aperture plates in the y-direction.

FIG. 4 is a sectional view showing a schematic configuration of the moving mechanism for the aperture plates 301a and 301b which define the width of the aperture 8 in the x-direction. The two aperture-plate moving mechanisms respectively provided for the x-direction and y-direction are identical in configuration (except that they are arranged in mutually orthogonal directions). Therefore, the following description only deals with the detailed configuration of the moving mechanism for the aperture plates 301a and 301b in the x-direction.

The aperture plates 301a and 301b are provided as a portion of the drive blocks 308a and 308b. The drive blocks 308a and 308b are respectively connected to guide members 307a and 307b which can move only in a specific direction ("along an axis") on a guide rail 306 of a linear motion guide. Each combination of the drive block and guide member moves as a single unit. The drive blocks 308a and 308b are respectively provided with insertion pins 303a and 303b which are to be inserted into the through-holes of float nuts 305a and 305b (which will be described later). The blocks also have through-holes into which a feed screw 302 and a spring 309 (both of which will be described later) are to be inserted. The aperture plates 301a and 301b (drive blocks 308a and 308b) constitute one pair. By moving these plates closer to or farther away from each other, the width of the aperture 8 in the x-direction is adjusted.

This moving mechanism for the apertures 301a and 301b has a feed screw 302 laid along the x-direction on which two oppositely-directed threads are formed from the central portion toward both ends. Float nuts 305a and 305b are respectively engaged with those oppositely-directed threads. The float nuts 305a and 305b each have a through-hole in addition to the threaded hole (female screw). The aforementioned insertion pins 303a and 303b are inserted into these through-holes. These pins prevent the float nuts 305a and 305b from rotating due to the rotation of the feed screw 302. Consequently, a rotation of the feed screw 302 produces a linear motion of the float nuts 305a and 305b in the opposite directions along the x-direction. The two drive blocks 308a and 308b are located at a central portion of this feed screw 302. The float nuts 305a and 305b are placed on the outsides of those two drive blocks.

Into the through-holes formed in the two drive blocks 308 and 308b, the feed screw 302 is inserted, along with a spring 309 for urging the drive blocks 308a and 308b toward the float nuts 305a and 305b placed on their respective outsides.

The surfaces of the drive blocks 308a and 308b in contact with the float nuts 305a and 305b are each shaped like a convex surface (cylindrical surface) having a curvature in the y-direction, as indicated by the alternate long and short dashed lines in the figure. The contact surfaces of the float nuts 305a and 305b are flat surfaces. Accordingly, the drive blocks 308a and 308b are in line contact with the float nuts 305a and 305b along the z-direction, respectively.

Figure 5:
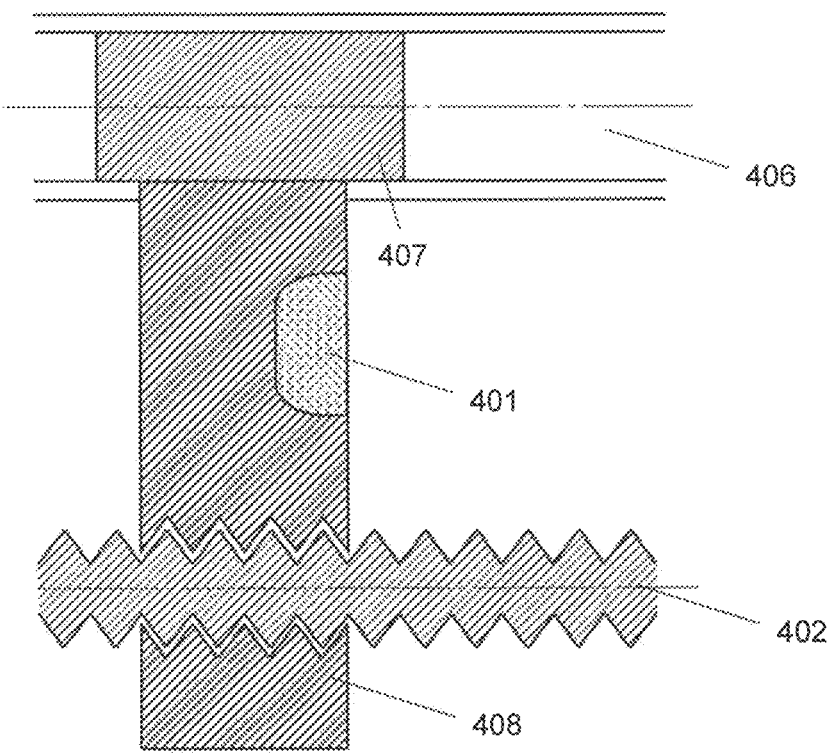
FIG. 5 is a partial configuration diagram of an aperture-plate drive mechanism included in a conventional infrared microscope.

As shown in FIG. 5, in a conventional moving mechanism for the aperture plate 401, the feed screw 402 is engaged with a threaded hole formed in the drive block 408, and the drive block 408 is directly driven by the rotation of the feed screw 402. This design is premised on that the axis of the feed screw and the rail of the linear motion guide are perfectly parallel to each other as well as at a predetermined distance from each other, as shown in FIG. 5. In practice, since the drive mechanism for the aperture plate 401 is constructed by assembling a plurality of members, an angular discrepancy as shown in FIG. 6 or a parallel dislocation as shown in FIG. 7 can occur due to some problems which occur in the production process, such as the size variation of each member or the assembling accuracy of those members.

Figure 6:
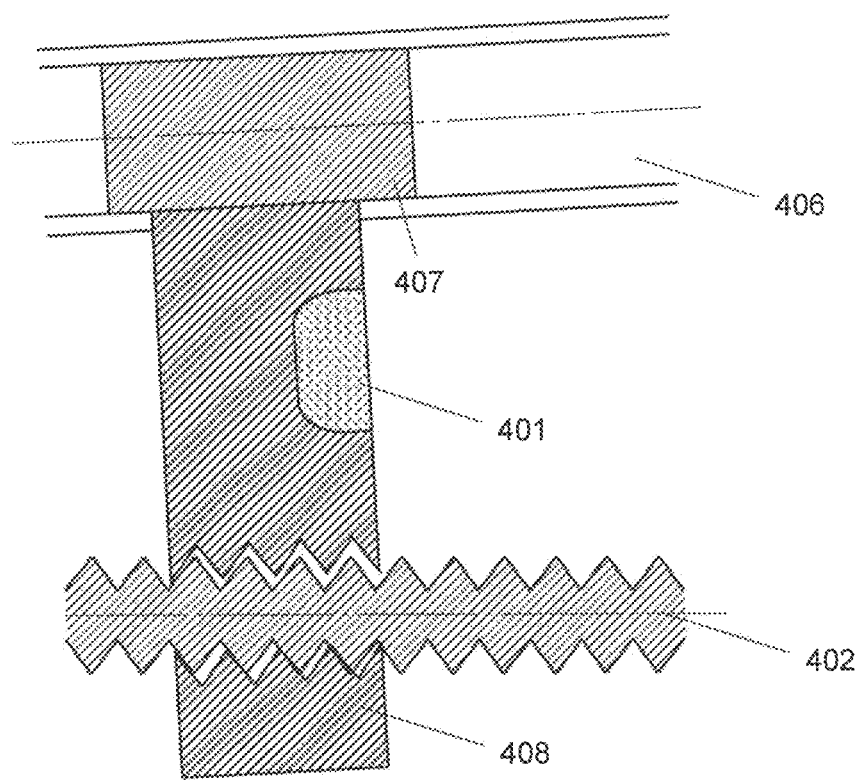
FIG. 6 is a diagram illustrating the case where there is an angular discrepancy between a guide rail (linear motion guide) and a feed screw in the aperture-plate drive mechanism included in the conventional infrared microscope.

If an angular discrepancy as shown in FIG. 6 occurs, the feed screw (male screw) 402 is obliquely inserted into the threaded hole (female screw) of the drive block 408 and comes in imbalanced contact with the inside of the threaded hole, causing the male screw to be locally in strong contact with the female screw. If the moving mechanism is operated in this state, a considerable force acts on the area where the male screw is in strong contact with the female screw, causing an abrasion of the screws. Consequently, the amount of backlash increases, and the accuracy of the moving distance of the drive block 408 (i.e. the positional accuracy of the aperture 8) deteriorates. Furthermore, if the powder resulting from the abrasion of the contact areas of the male and female screws accumulates in the gap between the male and female screws, the rotation load on the feed screw significantly increases and eventually prevents the rotation of the feed screw.

Figure 7:
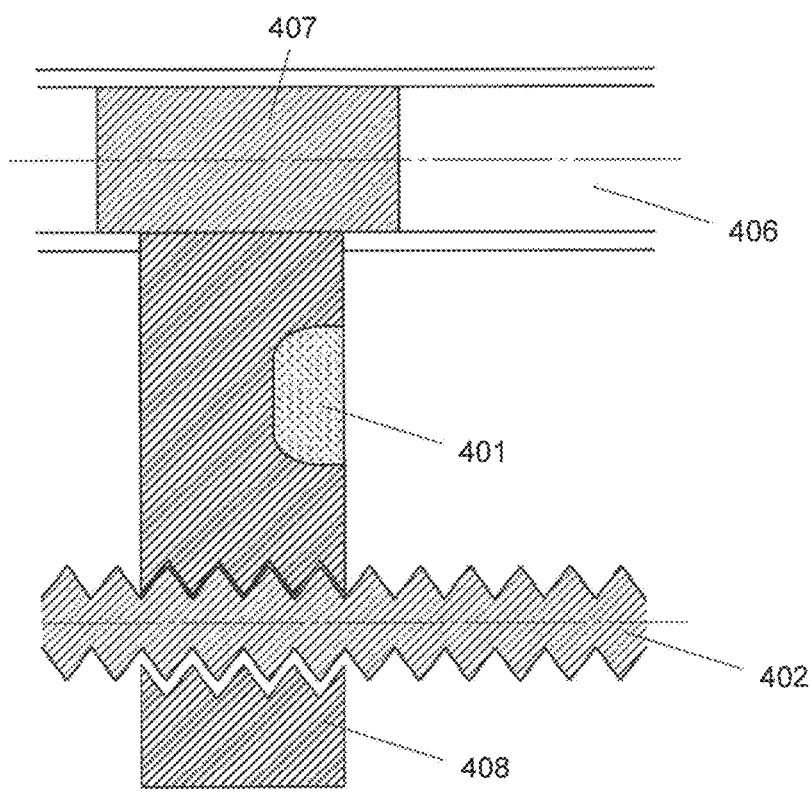
FIG. 7 is a diagram illustrating the case where there is a parallel dislocation of the guide rail (linear motion guide) and the feed screw in the aperture-plate drive mechanism included in the conventional infrared microscope.
Figure 8:
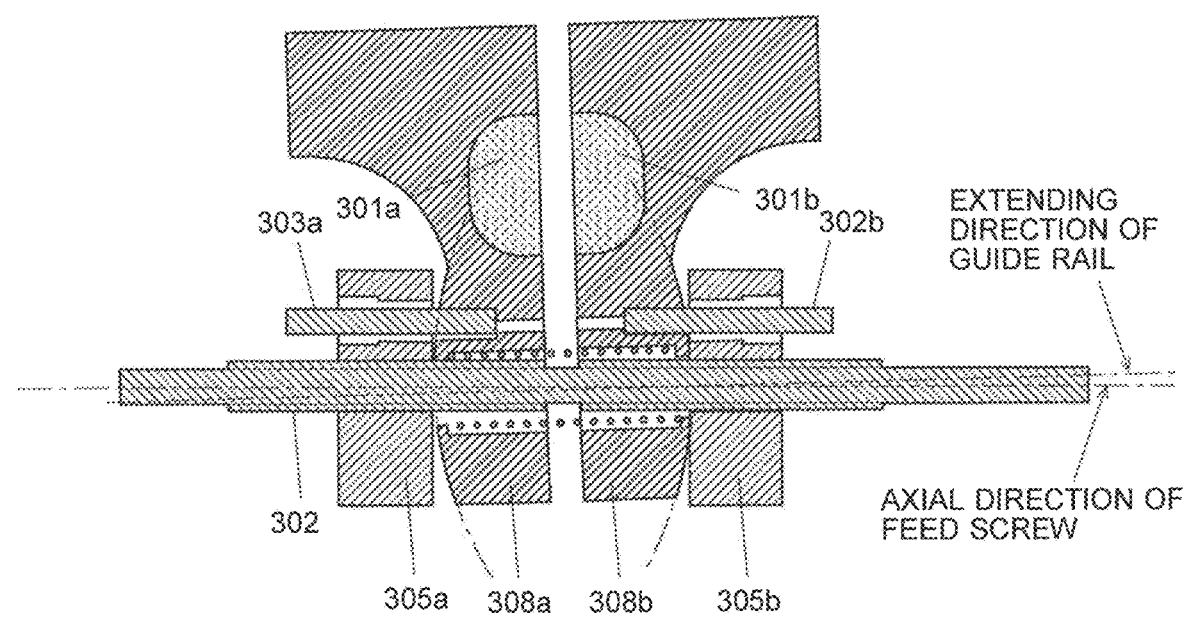
FIG. 8 is a partially enlarged view of the aperture-plate moving mechanism included in the infrared microscope according to the present embodiment, with an angular discrepancy allowed.

If a parallel dislocation as shown in FIG. 7 occurs (i.e. if the guide rail 406 and the feed screw 402 are parallel to each other but have an error in their separation distance), the previously described problem similarly occurs, since the feed screw 402 comes in contact with only one side of the threaded hole and causes the abrasion due to a considerable force acting on that side.

In the moving mechanism for the aperture plates 301a and 301b according to the present embodiment, the threaded holes are formed in the float nuts 305 and 305b. Those holes are engaged with the feed screw 302. The float nuts 305a and 305b are driven by the rotation of the feed screw 302. The spring 309 presses the drive blocks 308a and 308b onto the float nuts 305a and 305b, respectively, so as to make the drive blocks 308a and 308b follow the motion of the float nuts 305a and 305b. The surfaces of the drive blocks 308a and 308b in contact with the flat surfaces of the float nuts 305a and 305b are curved. Therefore, even if the extending direction of the guide rail 306 which restricts the moving direction of the drive blocks 308a and 308b (via the guide members 307a and 307b) is not perfectly parallel to the axis of the feed screw 302, the drive blocks 308a and 308b come in contact with the float nuts 305a and 305b at positions corresponding to the angle formed by the two aforementioned directions (FIG. 8), thereby allowing for the discrepancy. Furthermore, the drive blocks 308a and 308b are slidable on the flat surfaces of the float nuts 305a and 305b. Therefore, even if the separation distance between the guide rail 306 and the feed screw 302 is different from the design distance, the drive blocks 308a and 308b come in contact with the float nuts 305a and 305b at positions corresponding to that difference, thereby allowing for the difference. Thus, the feed screw 302 is prevented from coming in imbalanced contact with the inside of the threaded hole as shown in FIG. 6 or 7, so that the drive blocks 308a and 308b as well as the aperture plates 301a and 301b connected to these blocks can be accurately moved over a long period of time.

In the previous embodiment, the drive blocks 308a and 308b each have a cylindrical surface having a curvature only in the y-direction at the portion where the drive block 308a or 308b is in contact with the float nut 305a or 305b, while the float nuts 305a and 305b each have a flat contact surface. It is also possible to use other combinations as described below.

For example, if the contact portion of either the drive block 308a/308b or the float nut 305a/305b is a cylindrical convex surface having a curvature only in the y-direction while that of the other member is a cylindrical concave surface having a curvature only in the y-direction (with a larger radius of curvature than the aforementioned cylindrical surface), the two portions come in linear contact with each other along the z-direction at a position in the y-direction which minimizes the load on the motion of the drive block 308a/308b whose moving direction is determined by the guide rail 306 and that of the float nut 305a/305b whose moving direction is determined by the feed screw 302, depending on the angle formed by the linear motion guide and the feed screw. Therefore, even if the guide rail 306 and the feed screw 302 are not parallel to each other in the x-y plane, their angular discrepancy can be absorbed.

As another example, if the contact portion of either the drive block 308a/308b or the float nut 305a/305b is a convex surface having a curvature in the y-direction while that of the other member is a convex surface having a curvature in the z-direction, the two portions come in point contact with each other at a position in each of the y and z directions which minimizes the load on the motion of the drive block 308a/308b and the float nut 305a/305b, depending on the angle formed by the guide rail 306 and the feed screw 302. Therefore, even if the guide rail 306 and the feed screw 302 are not parallel to each other in the x-y plane as well as in the x-z plane, their angular discrepancy can be absorbed.

As still another example, if the contact portion of either the drive block 308a/308b or the float nut 305a/305b is a convex surface having a curvature in both y and z directions (e.g. a spherical surface, although the curvatures in the two directions do not always need to be the same) while that of the other member is a flat surface, the two portions similarly come in point contact with each other at a position in each of they and z directions which minimizes the load on the motion of the drive block 308a/308b and the float nut 305a/305b, depending on the angle formed by the guide rail 306 and the feed screw 302. Furthermore, a change in the position of the point contact does not cause a significant change in the load on the motion of the drive block and the float nut. Therefore, a parallel dislocation of the guide rail 306 and the feed screw 302 can also be absorbed in addition to the angular discrepancy between the two members.

The previously described embodiment is a mere example and can be appropriately changed within the spirit of the present invention.

Although the previous embodiment is concerned with the case of simultaneously moving two aperture plates (closer to or farther away from each other) with a single feed screw, the previously described configuration can similarly be adopted in the case of moving each aperture plate using a separate feed screw.

In the previous embodiment, the nut members are arranged on the outside of the drive blocks. Their positional relationship may be reversed. In that case, the spring should be arranged so as to press each drive block from outside inward (toward the nut member).

In the previous embodiment, the rotation of the nut members due to the rotation of the feed screw is prevented by the pins inserted into the through-holes formed in the nut members. The rotation may also be prevented by a member arranged on the outside of the nut members.

REFERENCE SIGNS LIST

1 . . . Sample
2 . . . Light Source Unit
1a . . . Measurement Target Area
3, 3a . . . First Mirror
4 . . . Second Mirror
5 . . . Third Mirror
6, 16 . . . Cassegrain Reflector
   6a, 16 . . . Concave Mirror
   6b, 16b . . . Convex Mirror
8 . . . Aperture
9 . . . Infrared Detector
14 . . . Fourth Mirror
15 . . . Fifth Mirror
21 . . . Visible-Light Mirror
22 . . . Camera
100, 200, 300 . . . Motor
110 . . . x-y Stage
120 . . . Rotation Axis Mer ber
130 . . . Belt
301a, 301b . . . Aperture Plate
302 . . . Feed Screw
303a, 303b . . . Insertion Pin
305a, 305b . . . Float Nut
306 . . . Guide Rail
307a, 307b . . . Guide Member
308a, 308b . . . Drip e Block
309 . . . Spring
401 . . . Aperture Plate
406 . . . Guide Rail
408 . . . Drive Block

The invention claimed is:

1. An aperture-plate moving mechanism, comprising:
a) a drive block fixed to an aperture plate;
b) a linear motion guide for allowing the drive block to move along an axis while preventing the drive block from moving in other directions;
c) a feed screw laid in a direction of the axis;
d) a nut member having a threaded hole engaged with the feed screw, the nut member being prevented from rotating due to a rotation of the feed screw; and
e) an urging member for pressing the drive block onto the nut member in the direction of the axis to make a contact portion of the drive block be in contact with a contact portion of the nut member,
where:
with respect to the direction of the axis, the contact portions of the drive block and the nut member are shaped so that one of the contact portions has a convex surface while the other contact portion has either a flat surface or a concave surface having a larger radius of curvature than the convex surface.

2. The aperture-plate moving mechanism according to claim 1, wherein the other contact portion is a flat surface.

3. The aperture-plate moving mechanism according to claim 1, wherein the other contact portion is a surface having a curvature in each of two directions which are orthogonal to each other.

4. The aperture-plate moving mechanism according to claim 2, wherein the other contact portion is a surface having a curvature in each of two directions which are orthogonal to each other.

5. The aperture-plate moving mechanism according to claim 1, wherein two helical threads proceeding in opposite directions are formed on the feed screw, and the threaded hole of the nut member is engaged with each of the threads.

6. The aperture-plate moving mechanism according to claim 2, wherein two helical threads proceeding in opposite directions are formed on the feed screw, and the threaded hole of the nut memberengaged with each of the threads.

7. The aperture-plate moving mechanism according to claim 3, wherein two helical threads proceeding in opposite directions are formed on the feed screw, and the threaded hole of the nut member is engaged with each of the threads.

8. The aperture-plate moving mechanism according to claim 4, wherein two helical threads proceeding in opposite directions are formed on the feed screw, and the threaded hole of the nut member is engaged with each of the threads.

9. An infrared microscope, comprising an aperture-plate moving mechanism including:
a) a drive block fixed to an aperture plate;
b) a linear motion guide for allowing the drive block to move along an axis while preventing the drive block from moving in other directions;
c) a feed screw laid in a direction of the axis;
d) a nut member having a threaded hole engaged with the feed screw, the nut member being prevented from rotating due to a rotation of the feed screw; and
e) an urging member for pressing the drive block onto the nut member in the direction of the axis to make a contact portion of the drive block be in contact with a contact portion of the nut member,
where:
with respect to the direction of the axis, the contact portions of the drive block and the nut member are shaped so that one of the contact portions has a convex surface while the other contact portion is has either a flat surface or a concave surface having a larger radius of curvature than the convex surface.

10. The infrared microscope according to claim 9, wherein the other contact portion is a flat surface.

11. The infrared microscope according to claim 9, wherein the other contact portion is a surface having a curvature in each of two directions which are orthogonal to each other.

12. The infrared microscope according to claim 10, wherein the other contact portion is a surface having a curvature in each of two directions which are orthogonal to each other.

13. The infrared microscope according to claim 9, wherein two helical threads proceeding in opposite directions are formed on the feed screw, and the threaded hole of the nut member is engaged with each of the threads.

14. The infrared microscope according to claim 10, wherein two helical threads proceeding in opposite directions are formed on the feed screw, and the threaded hole of the nut member is engaged with each of the threads.

15. The infrared microscope according to claim 11, wherein two helical threads proceeding in opposite directions are formed on the feed screw, and the threaded hole of the nut member is engaged with each the threads.

16. The infrared microscope according to claim 12, wherein two helical threads proceeding in opposite directions are formed on the feed screw, and the threaded hole of the nut member is engaged with each the threads.

* * * * *